(12) United States Patent
Imamura et al.

(10) Patent No.: US 6,778,868 B2
(45) Date of Patent: Aug. 17, 2004

(54) REMOTE CONTROL OF LAUNDRY APPLIANCE

(75) Inventors: Fumihiro Imamura, Seto (JP); Takahiro Nishimura, Nagoya (JP); Hiroshi Ikeda, Seto (JP); Satoru Matsumoto, Seto (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 09/950,001

(22) Filed: Sep. 12, 2001

(65) Prior Publication Data

US 2002/0032491 A1 Mar. 14, 2002

(30) Foreign Application Priority Data

Sep. 12, 2000 (JP) ........................................ 2000-277147
Sep. 12, 2000 (JP) ........................................ 2000-277148

(51) Int. Cl.[7] ............................ G05B 15/00; D06F 33/02
(52) U.S. Cl. ............................ 700/79; 700/21; 700/65; 700/66; 68/12.01; 68/12.02
(58) Field of Search .................... 700/65, 66, 78, 700/79, 80, 81, 82, 19, 21; 455/11.1; 710/106; 68/12.01, 12.02; 714/2, 25

(56) References Cited

U.S. PATENT DOCUMENTS

| | | | | |
|---|---|---|---|---|
| 4,310,896 A | * | 1/1982 | Cutler et al. ................ | 710/105 |
| 4,977,394 A | * | 12/1990 | Manson et al. .............. | 340/679 |
| 5,038,586 A | * | 8/1991 | Nukaga et al. .............. | 68/12.01 |
| 5,074,003 A | * | 12/1991 | Manson et al. .............. | 8/159 |
| 5,107,428 A | * | 4/1992 | Bethencourt et al. ......... | 701/35 |
| 5,315,502 A | * | 5/1994 | Koyama et al. .............. | 700/79 |
| 5,412,291 A | | 5/1995 | Payne et al. | |
| 5,511,397 A | * | 4/1996 | Makino et al. ............. | 68/12.27 |
| 5,541,840 A | * | 7/1996 | Gurne et al. ................ | 701/33 |
| 5,553,123 A | * | 9/1996 | Chan et al. ............. | 379/102.03 |
| 5,916,286 A | * | 6/1999 | Seashore et al. ............ | 701/29 |
| 5,987,105 A | * | 11/1999 | Jenkins et al. .......... | 379/106.01 |
| 6,061,668 A | | 5/2000 | Sharrow | |
| 6,275,922 B1 | * | 8/2001 | Bertsch ........................ | 712/36 |
| 6,374,079 B1 | * | 4/2002 | Hsu .......................... | 455/11.1 |
| 6,405,049 B2 | * | 6/2002 | Herrod et al. .............. | 455/517 |
| 6,526,581 B1 | * | 2/2003 | Edson .......................... | 725/74 |

FOREIGN PATENT DOCUMENTS

| | | |
|---|---|---|
| EP | 0 038 672 | 10/1981 |
| EP | 0 617 557 A2 | 9/1994 |
| EP | 0 716 361 A2 | 6/1996 |
| EP | 0 887 989 A2 | 12/1998 |
| GB | 2 286 903 | 8/1995 |
| JP | 10260866 A | 9/1998 |
| WO | WO 99/43068 | 8/1999 |

\* cited by examiner

Primary Examiner—Ramesh Patel
Assistant Examiner—Aaron C Perez-Daple
(74) Attorney, Agent, or Firm—Pillsbury Winthrop LLP

(57) ABSTRACT

A remote control system for a laundry appliance which includes a remote control device externally accessible via a communication network, the remote control device including a data base storing coping information used to cope with an abnormal condition occurring during operation of the laundry appliance, a laundry appliance control device connected via the communication network to the remote control device so as to transmit information about an abnormal condition via the communication network to the remote control device when the abnormal condition has occurred in the laundry appliance, and an analyzer for analyzing the coping information corresponding to the abnormal condition in the laundry appliance to infer a cause of the abnormal condition of the laundry appliance. When the analyzer analyzes a plurality of pieces of the analytic information, a higher priority is given to the analytic information corresponding to a cause of the abnormal condition with a larger number of times of occurrence.

10 Claims, 14 Drawing Sheets

| NUMBER OF TIMES OF OCCURRENCE | OPERATING STATE | CAUSE | MEASURES | TEST PROGRAM No. | EMERGENCY OPERATION PRPOGRAM No. |
|---|---|---|---|---|---|
| 10 | WATER SUPPLY | FAUCET LEFT OPEN | — | E5-T1 | — |
| 2 | WATER SUPPLY | DUST IN WATER SUPPLY VALVE | (REPLACEMENT OF WATER SUPPLY VALVE UNIT) | E5-T2 | — |
| 1 | WATER SUPPLY | FAILURE OF WATER SUPPLY VALVE UNIT | REPLACEMENT OF WATER SUPPLY VALVE UNIT AFTER CHECK | E5-T3 | P1 |

FIG. 8

FIG. 11A — WATER SUPPLY SYSTEM IS ABNORMAL IN WASHER-DRIER. (10)

FIG. 11B — WATER SUPPLY SYSTEM IS ABNORMAL. (29a)

FIG. 12A — WATER SUPPLY SYSTEM OF THE WASHER-DRIER IS BEING INSPECTED. (10)

FIG. 12B — WATER SUPPLY SYSTEM IS BEING INSPECTED. (29a)

FIG. 13A — CAUSE FOR ABNORMAL CONDITION IS BEING ANALYZED IN WASHER-DRIER. (10)

FIG. 13B — CAUSE FOR ABNORMAL CONDITION IS BEING ANALYZED. (29a)

FIG. 14A (10)

WATER SUPPLY VALVE OF WAHSER-DRIER HAS FAILED.

CONTACT HAS BEEN MADE WITH SERVICE CENTER.

WAIT FOR TELEPHONE CALL FROM SERVICE CENTER.

FIG. 14B (29a)

WATER SUPPLY VALVE HAS FAILED.

CONTACT HAS BEEN MADE WITH SERVICE CENTER.

WAIT FOR TELEPHONE CALL FROM SERVICE CENTER.

FIG. 15A (10)

WASHER-DRIER IS CHANGED TO EMERGENCY OPERATION.

BE CAREFUL.

DO NOT USE SOFTENER DURING EMERGENCY OPERATION.

FIG. 15B (29a)

WASHER-DRIER IS UNDER EMERGENCY OPERATION.

DO NOT USE SOFTENER.

FIG. 16A (10)

WASHER-DRIER IS CHANGED TO EMERGENCY OPERATION.

BE CAREFUL.

WATER LEVEL SOMETIMES DIFFER FROM SET WATER LEVEL.

FIG. 16B (29a)

WASHER-DRIER IS UNDER EMERGENCY OPERATION.

BE CAREFUL.

WATER LEVEL SOMETIMES DIFFER FROM SET WATER LEVEL.

REMOTE CONTROL OF LAUNDRY APPLIANCE

BACKGROUND OF THE INVENTION

1. Field of the Invention

This invention relates to remote maintenance and control of laundry appliances such as washing machines and clothes dryers.

2. Description of the Related Art

In conventional laundry appliances such as washing machines and clothes dryers, an operation is interrupted when occurrence of an abnormal condition is detected during the operation. For example, in washing machines, a washing operation is interrupted when occurrence of an abnormal condition is detected during water supply or dehydration. In this case, a buzzer is activated to inform of the abnormal condition, or a display provided on an operation panel displays an error code indicative of the abnormal condition. A user reviews an explanation of error codes described in an instruction manual of the laundry appliance to find measures.

More specifically, the user copes with the abnormal condition when the condition results from a wrong operation or the cause for the condition can easily be resolved. However, when the abnormal condition results from a failure or breakage in the laundry appliance, the user telephones a store or shop, or a service center of the maker to request replacement or repair of parts or components. In this case, the user explains the abnormal condition of the laundry appliance to a serviceman. However, the abnormal condition sometimes results from a combination of various causes. Accordingly, only the user's explanation is sometimes insufficient. The serviceman then inspects the cause for the abnormal condition when visiting the user's home. As a result, the repair takes much time.

SUMMARY OF THE INVENTION

Therefore, an object of the present invention is to provide a device, method and system for remote control of a laundry appliance which can cope with the occurrence of an abnormal condition of the laundry appliance quickly and suitably, and a recording medium on which a computer program for the abovementioned remote control of the laundry appliance is recorded, the computer program for the above-mentioned remote control of the laundry appliance, a laundry appliance control device, a method of controlling a laundry appliance, a recording medium on which an operation program for the laundry appliance is recorded, and the operation program for the laundry appliance.

The present invention provides a control system for a laundry appliance, comprising a remote control device externally accessible via a communication network, the remote control device including a database storing coping information used to cope with an abnormal condition occurring during operation of the laundry appliance, for every type of the laundry appliance, the coping information corresponding to causes for the abnormal condition and including analytic information about an operating state of the laundry appliance upon occurrence of the abnormal condition, the number of times of the abnormal condition and a measure coping with the abnormal condition; a laundry appliance control device connected via the communication network to the remote control device so as to transmit information about an abnormal condition via a communication network to the remote control device when the abnormal condition has occurred in the laundry appliance; and analyzing means for analyzing the coping information corresponding to the abnormal condition in the laundry appliance to infer a cause for the abnormal condition of the laundry appliance. When the analyzing means analyzes a plurality of pieces of the analytic information, a higher priority is given to the analytic information corresponding to a cause for the abnormal condition with a larger number of times of occurrence.

According to the above-described method, upon occurrence of an abnormal condition in the laundry appliance, the coping information necessary for coping with the abnormal condition is transmitted to the laundry appliance. Accordingly, the abnormal condition of the laundry appliance can quickly be found and a quick and suitable measure can be taken against the abnormal condition. Further, information about the abnormal condition of the laundry appliance occurred in the market can be managed in an intensive manner. Additionally, an accuracy in the remote control of the laundry appliance can be improved by making use of the information.

BRIEF DESCRIPTION OF THE DRAWING

Other objects, features and advantages of the present invention will become clear upon reviewing the following description of embodimens, made with reference to the accompanying drawings, in which:

FIG. 8 illustrates contents of information about failure analysis;

FIG. 11A shows a display screen of the home server displaying a message indicative of occurrence of an abnormal condition;

FIG. 11B shows a display screen of the display section of the laundry appliance displaying a message indicative of occurrence of an abnormal condition in water supply;

FIG. 12A shows a display screen of the home server displaying a message indicating that a test program is being executed;

FIG. 12B shows a display screen of the display section of the laundry appliance displaying a message indicating that the test program is being executed;

FIG. 13A shows a display screen of the home server displaying a message indicating that a cause for the abnormal condition is being analyzed;

FIG. 13B shows a display screen of the display section of the laundry appliance displaying a message indicating that a cause for the abnormal condition is being analyzed;

FIG. 14A shows a display screen of the display section of the home server displaying messages indicative of results of analysis; FIG. 14B shows a display screen of the display section of the laundry appliance displaying messages indicative of the results of analysis;

FIG. 15A shows a display screen of the display section of the home server displaying messages indicating that an emergency operation is being executed and precautions regarding an emergency operation;

FIG. 15B shows a display screen of the display section of the laundry appliance displaying messages indicating that an emergency operation is being executed and precautions regarding an emergency operation;

FIG. 16A shows another example of a display screen of the display section of the home server displaying messages indicating that an emergency operation is being executed and precautions regarding an emergency operation;

FIG. 16B shows another example of a display screen of the display section of the laundry appliance displaying messages indicating that an emergency operation is being executed and precautions regarding an emergency operation;

DETAILED DECRIPTION OF EMBODIMENTS

Figure 1:
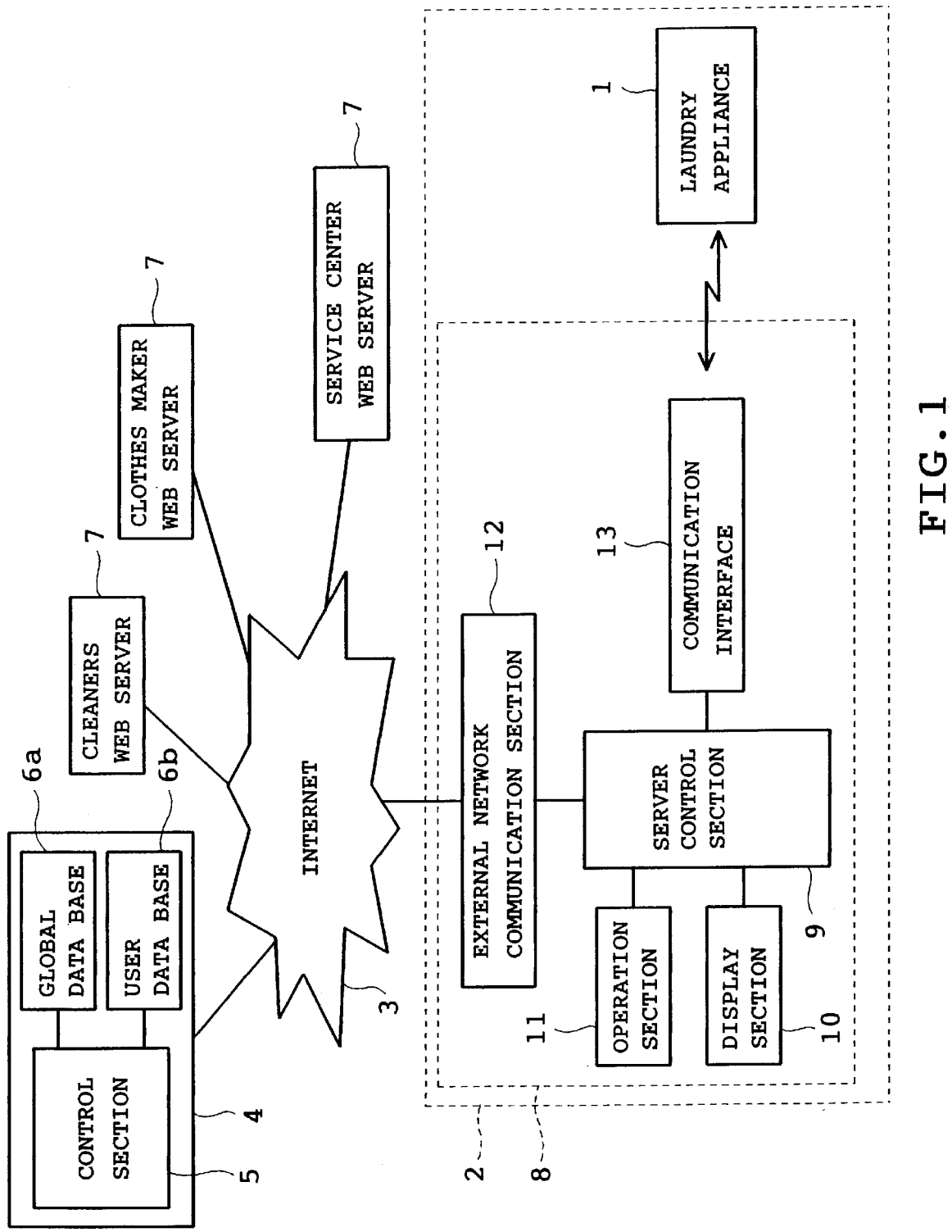
FIG. 1 is a schematic block diagram showing an electrical arrangement of a remote control system of a first embodiment in accordance with the present invention.

A first embodiment of the invention will be described with reference to FIGS. 1 to 16. Referring to FIG. 1, a remote control system for a laundry appliance in accordance with the invention is schematically shown. The system controls a laundry appliance 1 installed in every house or office. A manufacturer of household electric appliances such as the laundry appliance 1 and a refrigerator opens a Web site on an Internet 3 serving as a communication network with a Web server 4. The Web server 4 remote controls the household electric appliances in every home or more particularly, the laundry appliance 1. Thus, the Web server 4 functions as a remote control device.

The Web server 4 includes a control section 5 serving as failure analyzing means for analyzing a failure and a global data base 6a and a user data base 6b both serving as storage means. The global data base 6a stores information required for the control of the laundry appliance 1, namely, information about operation of every type of all laundry appliances 1 to be controlled, coping information, control information, and service information. The user data base 6b stores information about operation of the laundry appliance 1 in each house. The coping information includes data of a frequency in occurrence of abnormal condition for every type of the laundry appliance 1, data of an operating state in occurrence of abnormal condition, information about abnormal condition such as a test program, information about manner of coping with an abnormal condition of the laundry appliance 1, and information about an emergency operation including an emergency operation program for carrying out a washing operation with evasion of the abnormal condition.

The Web server 4 is connected via the Internet 3 to Web servers 7 of a service center of the household electric appliances, clothes makers and cleaners. The Web server 4 transmits and receives information to and from the Web servers 7.

Each of the household electric appliances marketed by the maker is provided with communication means, so that a home network can be constructed in a home when a dweller purchases one or more of the household electric appliances. The home network includes as a main component a home server 8. More specifically, the home server 8 communicates with each household electric appliance including the laundry appliance 1 and accesses via the Internet 3 to the Web servers 4 and 7. The home server 8 further transmits and receives an E-mail. In the embodiment, each household electric appliance and the home server 8 carry out communication by the Bluetooth.

The home server 8 is detachably attached to a front face of a door of a refrigerator used in the house. The home server 8 is powered from the refrigerator side. The home server 8 has a data base function, communication function and learning function. The home server 8 includes a server control section 9 including a microcomputer, ROM and RAM, a display section 10 connected to the server control section 9, an operation section 11, an external network communication section 12, and a communication interface. The home server 8 accesses via the section 12 and the Internet 3 to the Web server 4 to receive various pieces of information and various programs. Further, the home server 8 receives information about an operating state of the laundry appliance 1 via the interface 3 from the laundry appliance. The home server 8 transmits the received information about the operating state of the laundry appliance 1 to the web server 4. The laundry appliance 1 and the home server 8 constitute a laundry appliance control device 2.

The laundry appliance 1 is an automatic washer-drier of the drum type having washing and drying functions. The washer-drier includes an outer cabinet 37, a drum type water tub 38 elastically supported by a plurality of suspension mechanisms 39 provided in the outer cabinet 37. The suspension mechanisms 39 serve as elastic supporting means. A drum type rotatable tub (not shown) is provided in the water tub 38 so as to be rotated by an electric motor 21 (see FIG. 2). A front of the outer cabinet 37 has an access opening (not shown) through which laundry is put into and taken out of the rotatable tub. A lid 37a is provided on the front of the outer cabinet 37 so as to close and open the access opening.

A water supply device 40 is provided in the upper interior of the outer cabinet 37 for supplying water into the water tub 38. The water supply device 40 includes a water pouring vessel 41 having a detergent chamber 41a and a softener chamber 41b, a water supply pump 27 provided in the rear of the water pouring vessel 41, and a water supply valve unit 42. The water supply valve unit 42 has a first valve 24 and a second valve 25. The water supply valve unit 42 is connected via a water supply hose 43 to a faucet 33 of the water service. When the first valve 24 is opened, water from the water service is supplied through the detergent chamber 41a into the water tub 38. When the second valve 25 is opened, water from the water service is supplied through the hose 43 and softener chamber 41b into the water tub 38. A water sensor 34 is provided between the valve unit 42 and hose 43 for detecting the presence or absence of water in the hose 43. A flow rate sensor 35 is provided between the water supply valve unit 42 and the pouring vessel 41 for detecting a flow rate of supplied water.

Figure 2:
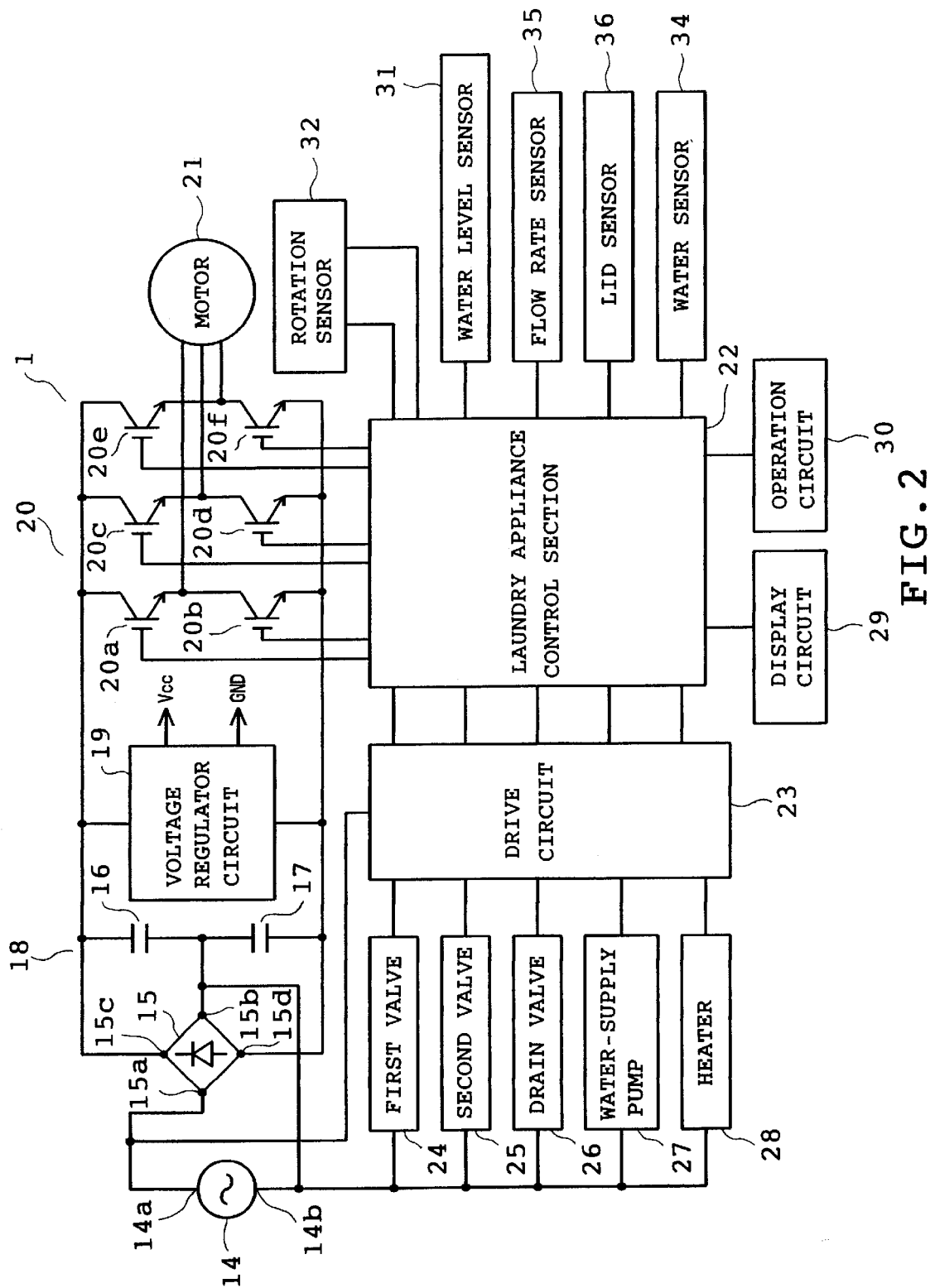
FIG. 2 is a block diagram showing an electrical arrangement of the laundry appliance.
Figure 3:
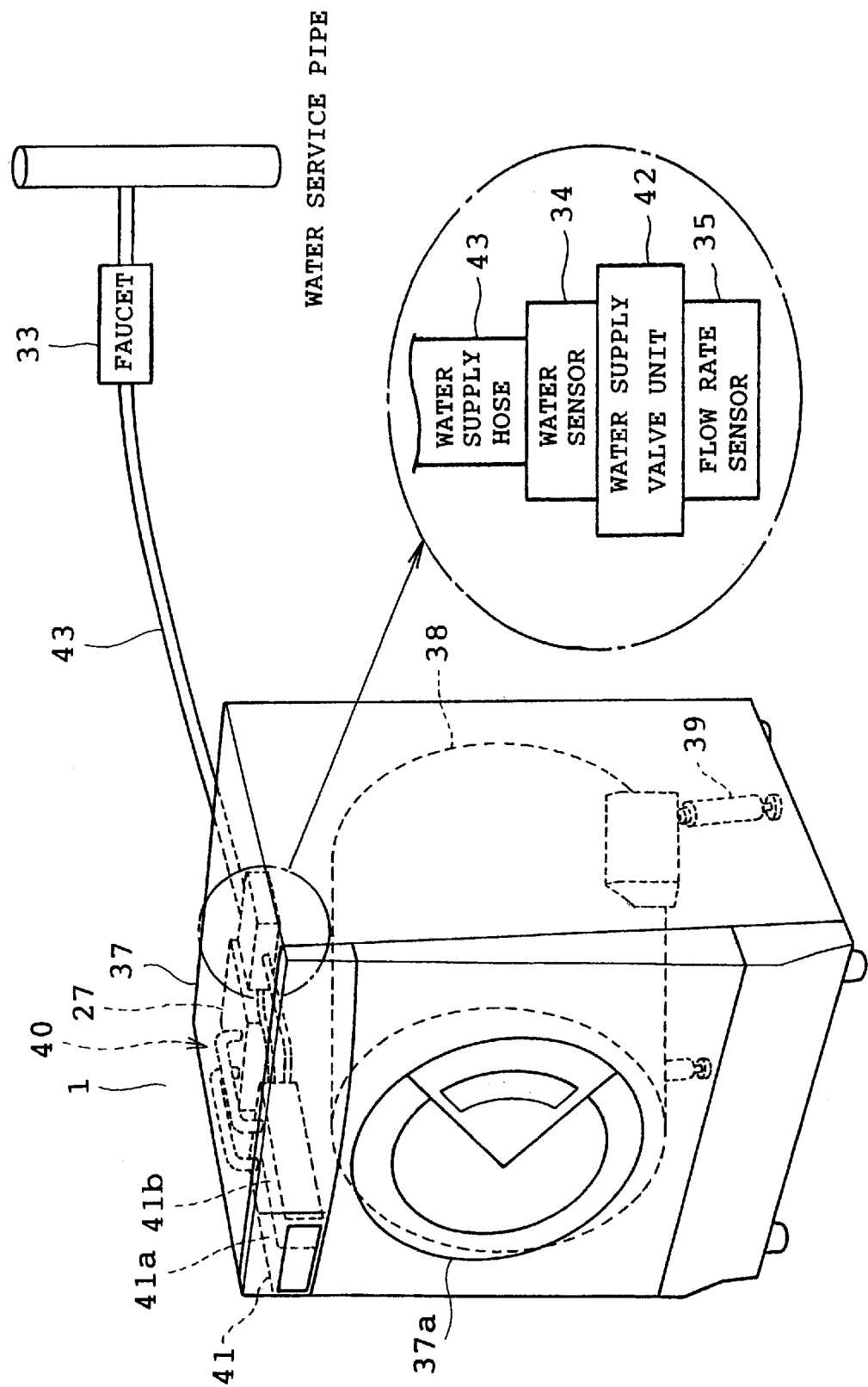
FIG. 3 is a perspective view of the laundry appliance.

Referring to FIG. 2, the electrical arrangement of the laundry appliance is shown. A DC power supply circuit 18 is connected to a 100V commercial AC power supply 14. The DC power supply circuit 18 includes a diode-bridge rectifier circuit 15 and smoothing capacitors 16 and 17. More specifically, the rectifier circuit 15 has input terminals 15a and 15b connected to power supply terminals 14a and 14b of the AC power supply 14 respectively. The rectifier circuit 15 further has output terminals 15c and 15d between which the smoothing capacitors 16 and 17 are serially connected. A common node of the smoothing capacitors 16 and 17 is connected to the input terminal 15c of the rectifier circuit 15.

A voltage regulator circuit 19 and an inverter main circuit 20 serving as motor drive circuit are connected to the DC power supply circuit 18. The inverter main circuit 20 includes switching elements 20a to 20f connected into a three-phase bridge configuration. Each switching element comprises IGBT. Output terminals of three-phase bridges are connected to three-phase windings of a stator of the motor 21 respectively. Thus, the motor 21 is driven by the inverter main circuit 20. The switching elements 20a to 20f of the inverter main circuit 20 are controlled by a laundry appliance control section 22 including a microcomputer, ROM and RAM. The laundry appliance control section 22 has a function of controlling the overall washing and drying operations and a function of communicating with the home server 8. The control section 22 stores a control program or various data.

A drive circuit 23 is connected to the power supply terminal 14a of the AC power supply 14. Between the power supply terminal 14b of the AC power supply 14 and the drive circuit 23 are connected the first valve 24, second valve 25, drain valve 26, water supply pump 27 and heater 28. To the laundry appliance control section 22 are connected a display circuit 29 with a display section 29a, an operation circuit 30 with various switches, water level sensor 30, rotation sensor 32, water sensor 34, flow rate sensor 35 and lid sensor 36. The water level sensor 31 delivers an output signal according to a water level in the rotatable tub of the laundry appliance 1. The rotation sensor 32 delivers a signal according to a rotational speed of the motor 21. The lid sensor 36 delivers a signal indicative of an open or closed state of the lid 37a.

The laundry appliance control section 22 controls the drive circuit 23 thereby to control the first and second valves 24 and 25, drain valve 26, water supply pump 27 and heater 28 on the basis of switch signals from the operation circuit 30 and signals from the sensors. The laundry appliance control section 22 serves as motor control means, water supply and drain control means and heater control means. The laundry appliance control section 22 and lid sensor 36 serve as lid detecting means.

Figure 4:
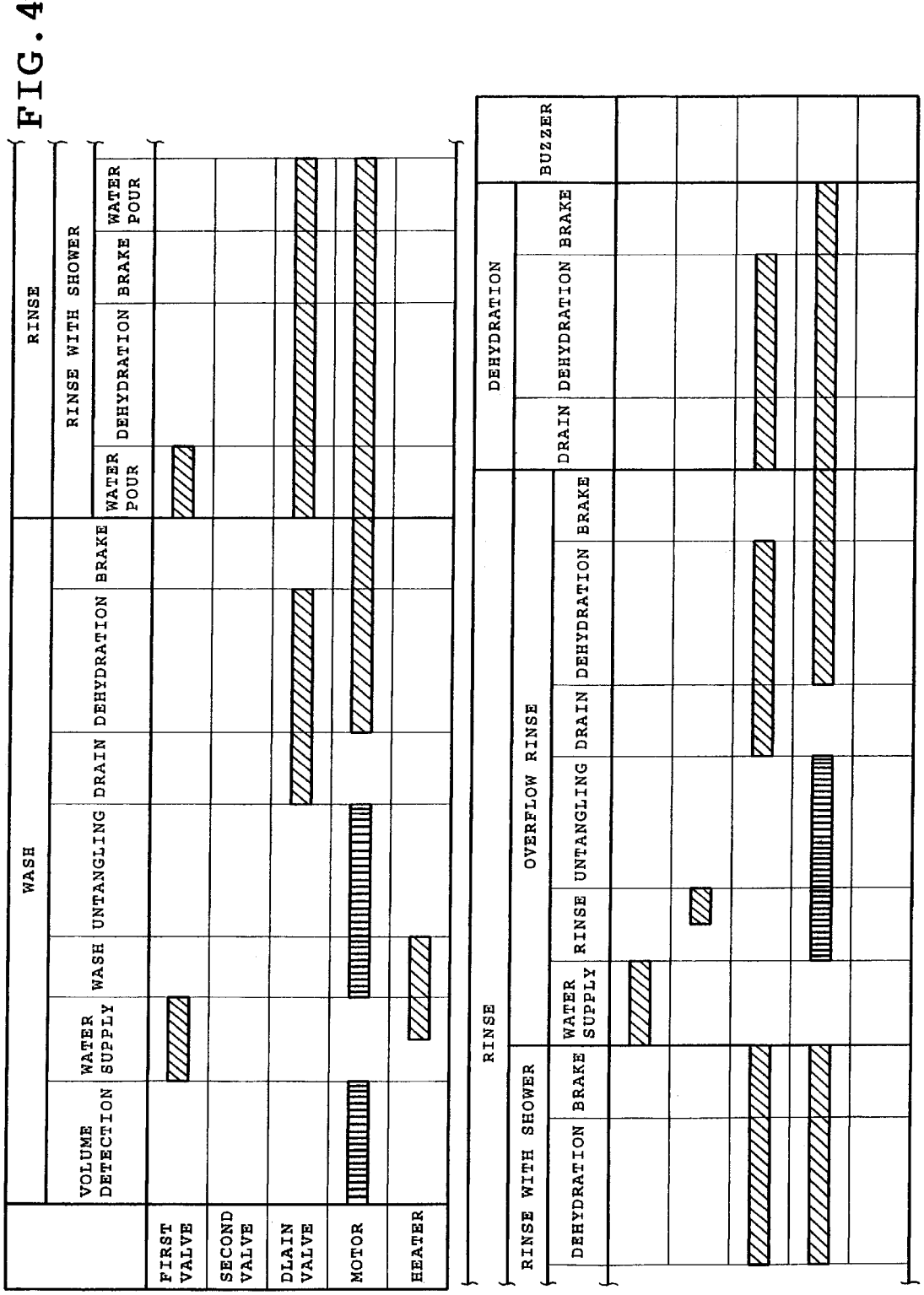
FIG. 4 shows operating states of first and second valves, drain valve, motor and heater in each of the steps of an automatic operation course.

The operation of the remote control system will now be described with reference to FIGS. 4 to 16. An operation of the laundry appliance 1 in the normal state will first be described with reference to FIG. 4. One of a number of operation courses is selected in the laundry appliance 1. The laundry appliance control section 22 stores a control program for executing each operation course. The control section 22 executes a control program corresponding to an operation course set on the basis of the aforesaid switch signals and detection signals. For example, when a STANDARD course has been set, a wash step, a rinse step and a dehydration step are sequentially carried out as shown in FIG. 4. In each step, water supply, drain, dehydration, etc. are sequentially carried out. In this case, the motor 21, first valve 24 second valve 25, drain valve 26 and heater 28 are driven in respective periods shown in FIG. 4. The motor 21 is rotated alternately in opposite directions in periods shown by vertical stripes whereas it is rotated only in one direction in periods shown by oblique stripes. Further, the laundry appliance control section 22 detects occurrence of an abnormal condition in the laundry appliance 1 on the basis of each aforesaid detection signal. Upon detection of the abnormal condition, the control section 22 transmits information about the abnormal condition via the home server 8 to the Web server 4.

Figure 5:
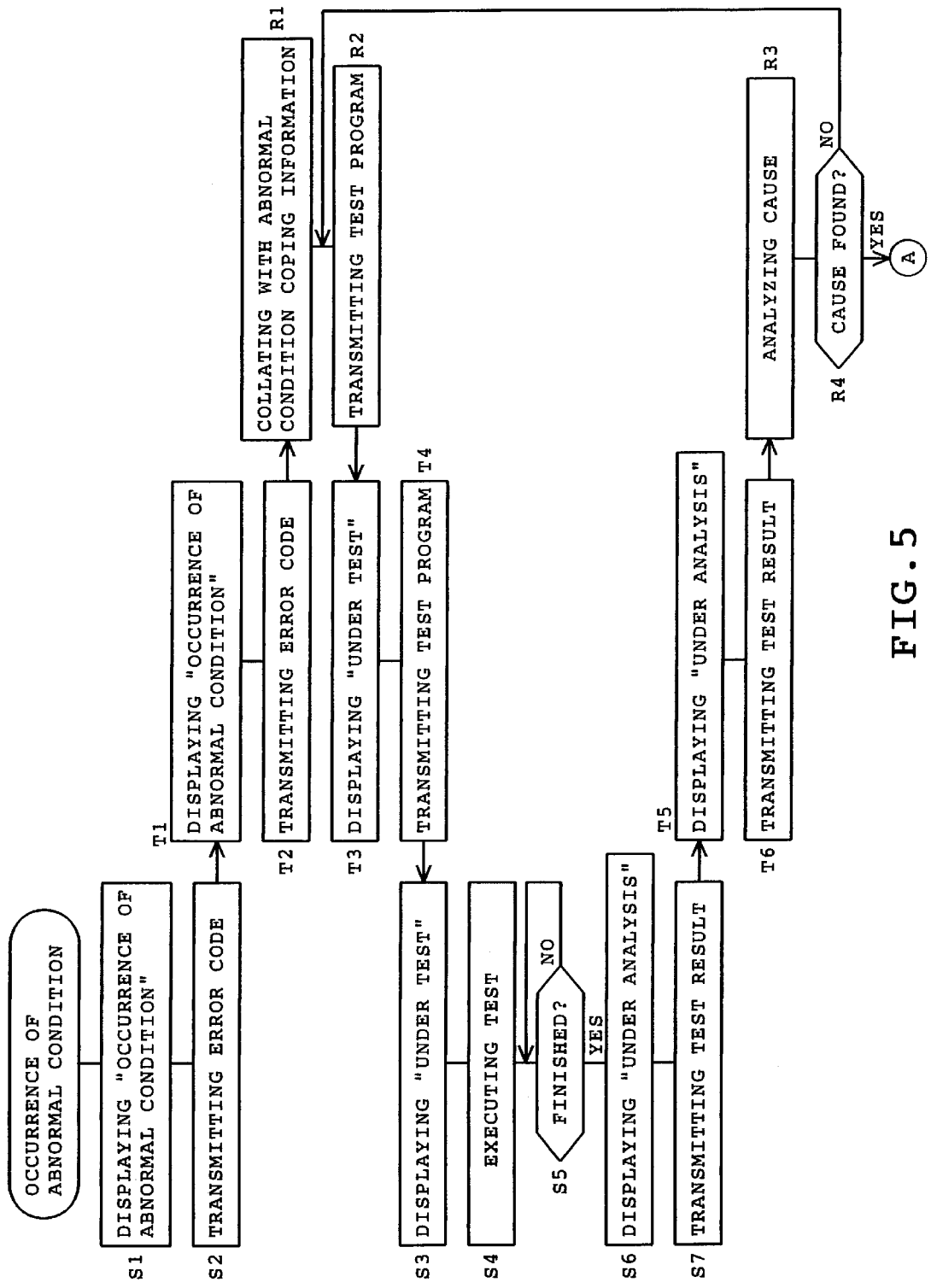
FIGS. 5 and 6 are flowcharts showing the processing by the remote control system in the occurrence of an abnormal condition.
Figure 6:
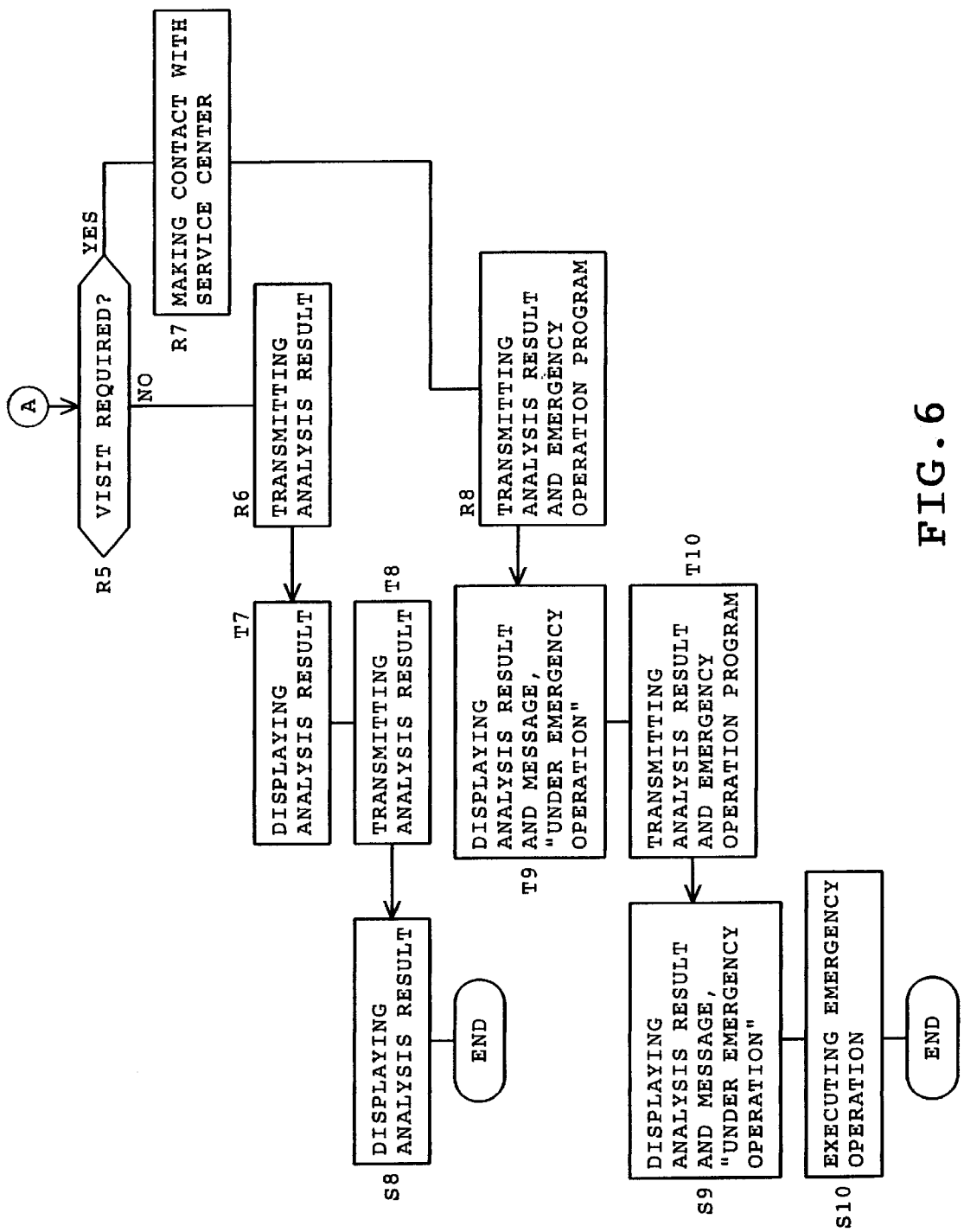
Figure 7:
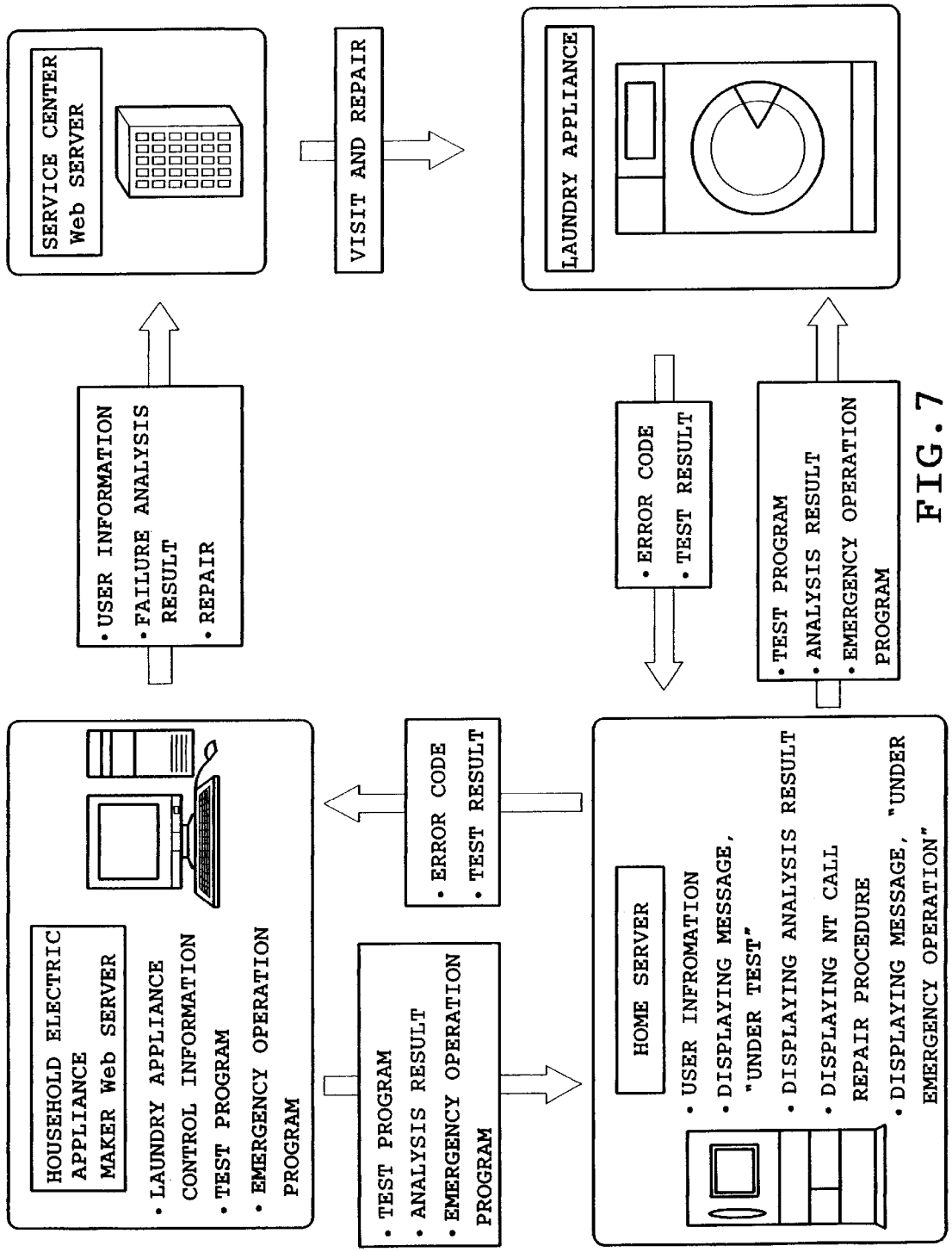
FIG. 7 shows a flow of information in the occurrence of the abnormal condition.

The remote control of the laundry appliance 1 will now be described with reference to FIGS. 5 to 16. FIGS. 5 and 6 show processing carried out by the overall system. In FIG. 5, steps S1 to S7 are processed by the laundry appliance control section 22. Steps T1 to T6 are processed by the server control section 9. Steps R1 to R4 are processed by the control section 5. In FIG. 6, steps S8 to S10 are processed by the control section 22. Steps T7 to T10 are processed by the server control section 9. Steps R5 to R8 are processed by the control section 5.

Upon detection of an abnormal condition in the laundry appliance 1, the control section 22 interrupts the control program, causing the display 29a to display a message indicative of occurrence of the abnormal condition (step S1). The control section 22 further transmits an error code indicative of the abnormal condition (corresponding to information about the abnormal condition)(step S2). Upon receipt of the error code from the laundry appliance 1, the server control section 9 causes the display 10 to display a message indicative of occurrence of the abnormal condition (step T1) and transmits the error code via the external network communication section 12 and the Internet 3 to the Web server 4 (step T2).

For example, upon occurrence of an abnormal condition in the water supplying operation, the home server 8 causes the display 29a to display a message, "WATER SUPPLY SYSTEM IS ABNORMAL IN WASHER-DRIER." As shown in FIG. 11A. Further, the laundry appliance 1 causes the display 10 to display a message, "WATER SUPPLY SYSTEM IS ABNORMAL." As shown in FIG. 11B. Upon receipt of the error code, the control section 5 of the Web server 4 refers to coping information stored on the global data base 6a, writing coping information corresponding to the type of the laundry appliance 1 onto the user data base 6b (step R1). The control section 5 further refers to the coping information stored on the user data base 6b to transmit to the home server 8 a test program for inspecting the abnormal condition in the laundry appliance 1 (step R2). The aforesaid coping information is originated on the basis of information the laundry appliance control sections 22 have transmitted via the server control sections 9 to the Web server 4 upon occurrence of abnormal conditions in all the laundry appliances 1 controlled by the Web server 4. The aforesaid coping information is originated for every abnormal condition.

FIG. 8 shows the coping information for the abnormal condition in water supply. The coping information contains information about the number of times of occurrence (frequency), an operating state of the laundry appliance 1 upon occurrence of the abnormal condition in the water supply, a cause for the abnormal condition, measures taken by the serviceman, the test program number, and emergency operation program number. The aforesaid test program is sufficient for analyzing a cause for the abnormal condition. Three test programs are provided in the example as shown in FIG. 8. In the embodiment, when the control section 5 transmits a plurality of test programs, a higher priority is given to the test program corresponding to a cause for the abnormal condition with a larger number of times of occurrence. The emergency operation program causes the laundry appliance 1 to carry out an emergency operation in which a portion of a failure is evaded, when the cause for the abnormal condition is the failure in the laundry appliance.

Upon receipt of the test program, the server control section 9 causes the display 10 to display a message indicating that the test program is under execution (step T3) and transmits the received test program to the laundry appliance 1 (step T4). Further, the laundry appliance control section 22 causes the display 29a to display a message indicating that the test program is under execution (step S3) and executes the received test program (step S4). For example, in the case of the abnormal condition in the water supply, the home server 8 causes the display 10 to display a message, "WATER SUPPLY SYSTEM OF WASHER-DRIER IS BEING INSPECTED." as shown in FIG. 12A. Further, the laundry appliance 1 causes the display 29a to display a message, "WATER SUPPLY SYSTEM IS BEING INSPECTED." as shown in FIG. 12B. Upon completion of the test program (YES at step S5), the control section 22 changes the message displayed on the display 29a to one indicating that the cause for the abnormal condition is being analyzed (step S6) and transmits a result of the test to the home server 8 (step S7).

Upon receipt of the test result, the server control section 9 changes the message displayed on the display 10 to one indicating that a cause for the abnormal condition is being analyzed (step T5) and causes the external network communication section 12 to transmit the test result via the Internet 3 to the Web server 4 (step T6). For example, in the case of the abnormal condition in the water supply, the home server 8 causes the display 10 to display a message, "CAUSE FOR ABNORMAL CONDITION IS BEING ANALYZED IN WASHER-DRIER." as shown in FIG. 13A. Further, the laundry appliance 1 causes the display 29a to display a message, "CAUSE FOR ABNORMAL CONDITION IS BEING ANALYZED." as shown in FIG. 13B.

Based on the test result and data stored on each of the data bases 6a and 6b, the control section 5 analyzes a portion which becomes a cause for the abnormal condition and determines whether the cause for the abnormal condition is due to a failure in the laundry appliance 1 or an improper use by the user (step R3). When the cause for the abnormal condition has been found (YES at step R4), the control section 5 advances to step R5. On the other hand, when no cause for the abnormal condition has been found (NO at step R4), the control section 5 returns to step R2 to transmit the next test program. When determining that the abnormal condition is due to the improper use by the user, the control section 5 further determines that the visit by the serviceman is unnecessary (NO at step R5), transmitting a result of analysis to the home server 8 (step R6). Based on the received result of the analysis, the server control section 9 causes the display 10 to display a message urging the user to confirm the mode of use (step T7) and transmits the analysis result to the laundry appliance 1 (step T8). Additionally, based on the analysis result received from the home server 8, the laundry appliance control section 22 causes the display 29a to display a message urging the user to confirm the mode of use (step S8).

On the other hand, when determining that the abnormal condition is due to a failure in the laundry appliance 1, the control section 5 further determines that the visit and repair by the serviceman is necessary (YES at step R5), asking the home server 8 for user information including the user's name, address, telephone number, mail address to receive the user information. The control section 5 further transmits the analysis result and information about repair (repair procedure and components and parts to be replaced) together with the user information via the Internet 3 to the Web server 7 of the service center (step R7).

The control section 5 further transmits to the home server 8 the analysis result and an emergency operation program corresponding to the analysis result (step R8). Based on the received analysis result, the server control section 9 causes the display 10 to display the contents of failure, a message indicating that contact has been made with the service center, and a message indicating that an emergency operation is under execution (step T9). The server control section 9 further transmits the analysis result and the emergency operation program to the laundry appliance 1 (step T10).

Based on the received analysis result, the laundry appliance control section 22 causes the display 20a to display the contents of failure, a message indicating that contact has been made with the service center, and a message indicating that an emergency operation is under execution (step S9). The control section 22 further carries out the received emergency operation program (step S10). As a result, the control section 22 continues the washing operation according to the emergency operation program as long as possible until repair is completed.

Figure 9:
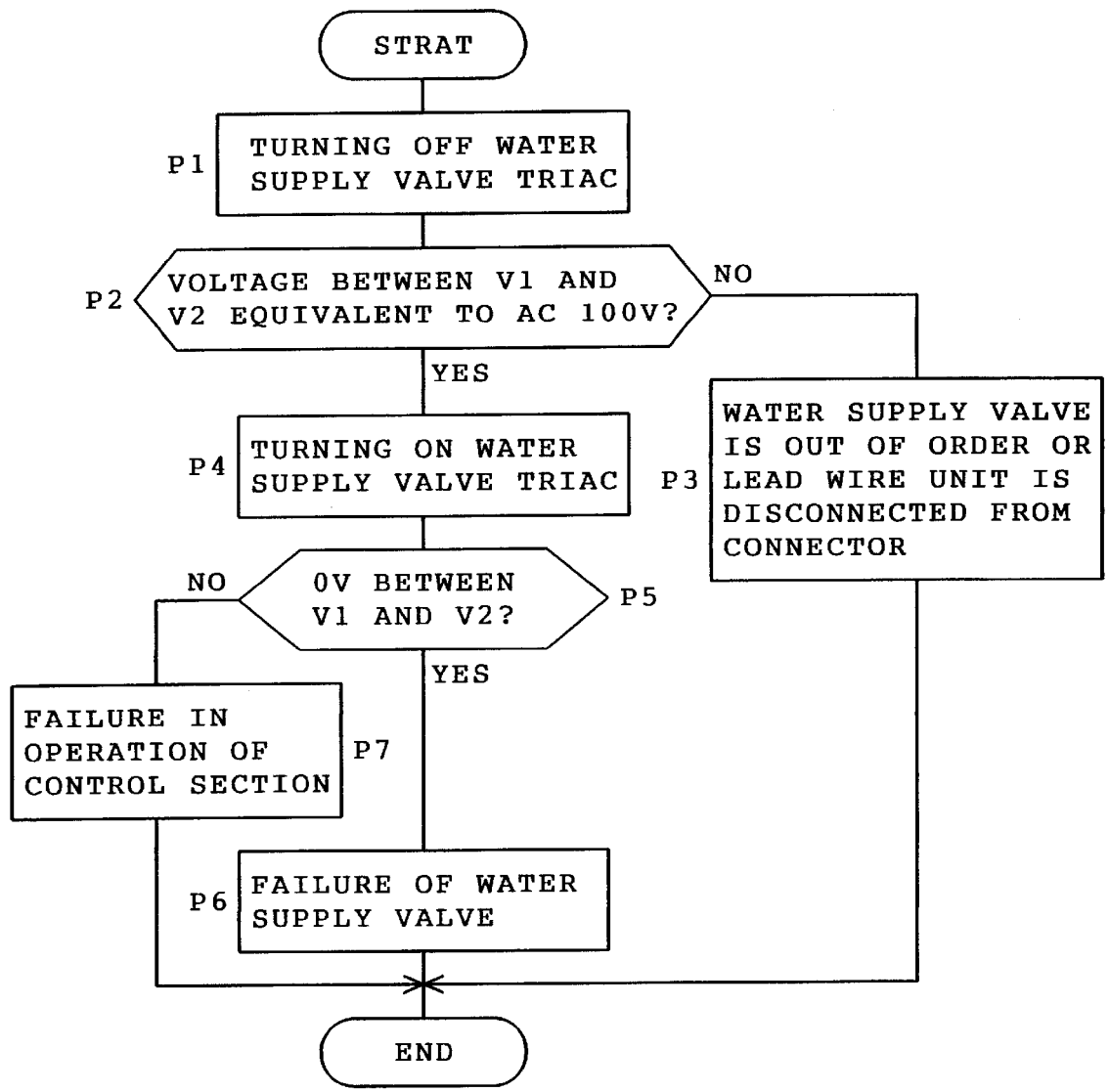
FIG. 9 is a flowchart showing the processing according to a test program concerning a first valve.
Figure 10:
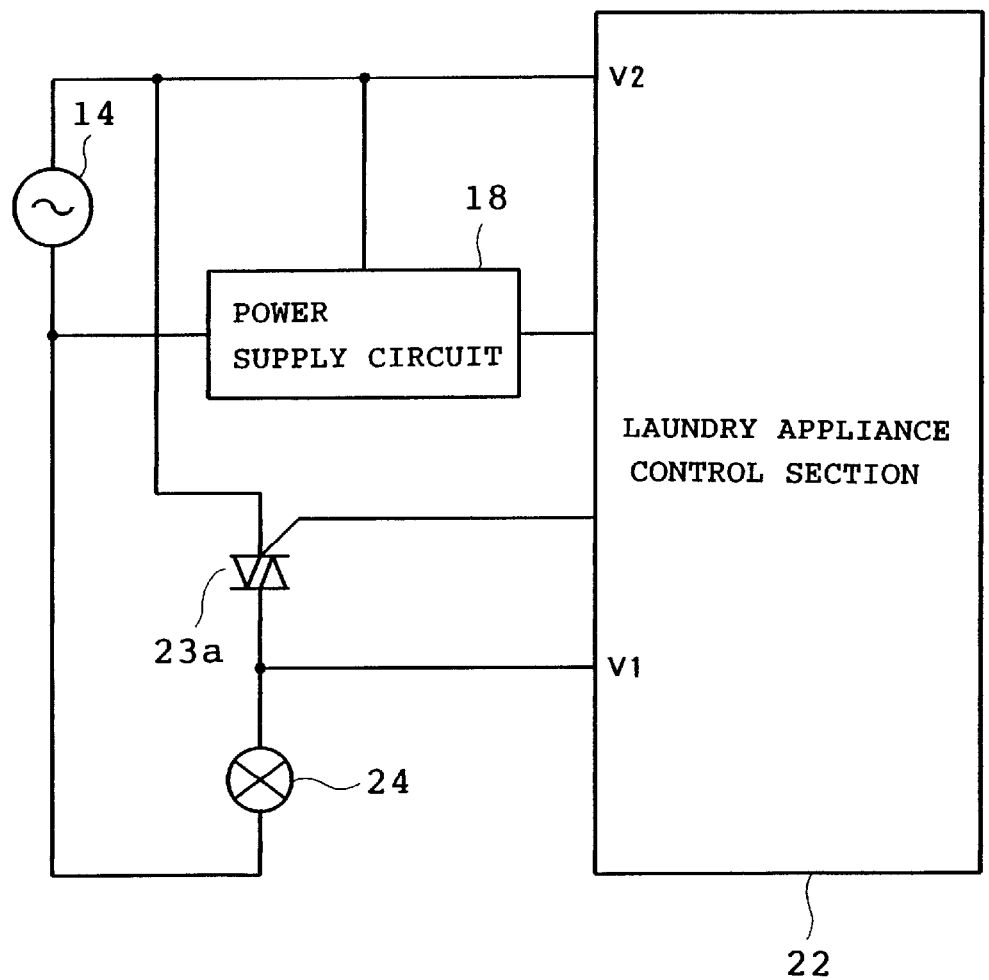
FIG. 10 is a block diagram showing an electrical arrangement around the first valve of the laundry appliance.

FIGS. 9 and 10 shows processes executed by the Web server 4 on the basis of the test program transmitted from the Web server 4 to the laundry appliance 1 upon occurrence of the abnormal condition in the water supply system and the test result. When the Web server transmits the test programs to the laundry appliance 1, a higher priority is given to the test program corresponding to a cause for the abnormal condition with a larger number of times of occurrence, as described above. In the case of the abnormal condition in the water supply system, test programs, "E5-T1," "E5-T2" and "E5-T2" are transmitted sequentially in this order. In the test program "E5-T1," the presence or absence of water in the water supply hose is detected by the water sensor 34 so that whether the faucet 33 is left open is checked. When the test program is carried out and the test result shows that no water is in the water supply hose 43, the control section 5 determines that the abnormal condition is due to the faucet 33 left open. On the other hand, when the test result shows that water is present in the water supply hose 43, the control section 5 determines that the cause for the abnormal condition has not been determined.

In the test program "E5-T2," a flow rate is detected by the flow rate sensor 35 so that dust in the water supply valve unit 42 is checked. The test program "E5-T2" is carried out in the laundry appliance 1, and the control section 5 determines that the cause for the abnormal condition is dust in the water supply valve unit 42 when a flow rate detected by the flow rate sensor 35 is below a predetermined value. On the other hand, when the detected flow rate is at or above the predetermined value, the control section 5 determines that the cause for the abnormal condition cannot be found.

In the test program "E5-T3," failure in operation of the water supply valve unit 42 is checked. The failure includes failure of the first and second valves 24 and 25 and disconnection of lead wire units of the valves 24 and 25 from the connector. In the embodiment, failure of the first valve 24 is exemplified. The test program "E5-T3" is carried out in the laundry appliance 1. Based on a result of test, the control section 5 of the Web server 4 analyzes the first valve 24 and the portion related to the valve. At step P1, the control section 5 causes the laundry appliance control section 22 to turn off a triac 23a constituting a drive circuit for the valve 24, thereby obtaining voltage between V1 and V2 as a result of test. When the obtained voltage is not equivalent to 100 V (NO at step P2), the control section 5 determines that the first valve 24 has failed or the lead wire unit has been disconnected from the connected (step P3).

On the other hand, when the obtained voltage is equivalent to 100 V (YES at step P2), the control section 5 causes the laundry appliance control section 22 to turn on the triac 23a, thereby obtaining voltage between V1 and V2 as a test result (step P4). When the obtained voltage is at 0 V (YES at step P5), the control section 5 determines that the first valve 24 has failed (step P6). Further, when the obtained voltage is not at 0 V (NO at step P5), the control section 5 determines that the laundry appliance control section 22 has failed (step P7).

When determining that the abnormal condition is due to any one of failure of the water supply valve, disconnection of the lead wire unit from the connector, and failure in the control section as the result of analysis, the control section 5 further determines that visit and repair by the serviceman is required. In this case, the home server 8 and the laundry appliance 1 display a message, "WATER SUPPLY VALVE (OF WASHER-DRIER) HAS FAILED. CONTACT HAS BEEN MADE WITH SERVICE CENTER. WAIT FOR TELEPHONE CALL FROM SERVICE CENTER." as shown in FIGS. 14A and 14B. Furthermore, when determining that the abnormal condition is due to the faucet left open or dust in the water supply valve as the result of analysis, the control section 5 further determines that visit and repair by the serviceman is not required. In this case, the home server 8 and the laundry appliance 1 display a message urging the user to confirm the mode of use, such as "IS FAUCET OPEN?"

Additionally, when determining that the abnormal condition is due to any one of failure of the water supply valve, disconnection of the lead wire unit from the connector, and failure in the control section, the Web server 4 transmits an emergency operation program via the home server 8 to the laundry appliance 1. As a result, the laundry appliance control section 22 executes the water supply and pouring by means of either one of the valves 24 and 25 which has no failure. Accordingly, when the first valve 24 and a related portion thereof are wrong, for example, the water supply and pouring are carried out through the softener chamber 41b of the pouring vessel 41. Thus, when only the softener chamber 41b can be used, this chamber is used as a detergent chamber. The home server 8 and the laundry appliance 1 each display a message, "WASH-DRIER IS CHANGED TO EMERGENCY OPERATION. DO NOT USE SOFTENER DURING EMERGENCY OPERATION." as shown in FIGS. 15A and 15B.

When determining that the abnormal condition is due to a failure of the water level sensor 31, the Web server 4 transmits an emergency operation program for controlling the water supply and draining to the laundry appliance 1. The home server 8 and the laundry appliance 1 each display a message, "WASHER-DRIER IS CHANGED TO EMERGENCY OPERATION. WATER LEVEL SOMETIMES DIFFER FROM SET WATER LEVEL." as shown in FIGS. 16A and 16B. In this case, the laundry appliance control section 22 is preferably provided with storage means such as a non-volatile memory for storing data of a water-supply flow rate and draining flow rate in a normal operation so that a water-supply time and a draining time are set on the basis of the water-supply flow rate and the draining flow rate stored on the storage means respectively. Consequently, the water level in the emergency operation can be approximated to the set water level.

When determining that the abnormal condition is due to a failure of the lid sensor 36 or suspension 39, the Web server 4 transmits to the laundry appliance 1 an emergency operation program in which the rotational speed of the motor 21 in the dehydration is rendered lower than usual or an emergency operation program in which a dehydrating operation is eliminated from each step of the washing operation. Furthermore, when determining that the abnormal condition is due to a failure of the heater 28, the Web server 4 transmits to the laundry appliance 1 an emergency operation program in which the heater 28 is not energized.

According to the foregoing embodiment, the laundry appliance 1 connected to the home network is further connected via the home server 8 and Internet 3 to the Web server 4. Upon occurrence of an abnormal condition in the laundry appliance 1, information about the abnormal condition is automatically transmitted to the Web server 4. Accordingly, the Web server 4 can quickly recognize the occurrence of abnormal condition in the laundry appliance 1.

Upon receipt of the information about the abnormal condition, the Web server 4 transmits the test program to the laundry appliance 1 so that a test is carried out to analyze the cause for the abnormal condition. The Web server 4 can obtain detailed information about the cause for the abnormal condition on the basis of a result of the test. Further, since the control section 22 of the laundry appliance 1 need not previously store test programs for various abnormal conditions respectively, the memory capacity of the control section 22 can be reduced. Additionally, the Web server 4 refers to the information stored on the global data base 6a to cause the laundry appliance 1 to carry out the test program according to the abnormal condition. Consequently, accurate information can be obtained about the cause for the abnormal condition. Moreover, since the test programs differ from one another for every supposed cause for each abnormal condition, more accurate information can be obtained.

The Web server 4 determines the cause for the abnormal condition on the basis of the test result and causes the displays 10 and 29a of the home server 8 and the laundry appliance 1 to display the result of determination. As a result, the user can properly cope with the abnormal condition of the laundry appliance 1. Further, when determining that the abnormal condition is due to a failure in the laundry appliance 1 and the user cannot cope with the failure, the Web server 4 automatically requests the service center to repair the laundry appliance 1 via the Internet 3. Accordingly, the service center can quickly arrange components or parts required for the repair on the basis of the result of determination regarding the cause for the abnormal condition. The serviceman can readily start repair upon arrival at the user's home.

When determining that the abnormal condition is due to a failure in the laundry appliance 1, the Web server 4 transmits the emergency operation program to the laundry appliance 1 so that the emergency operation is carried out. The laundry appliance 1 cannot conventionally be used until the repair by the service man is completed. However, such inconvenience can be solved in the embodiment. Further, the information necessary for the emergency operation is displayed on the displays 10 and 29a of the home server 8 and the laundry appliance 1 respectively. Consequently, inconvenience in the emergency operation can be reduced.

Figure 17:
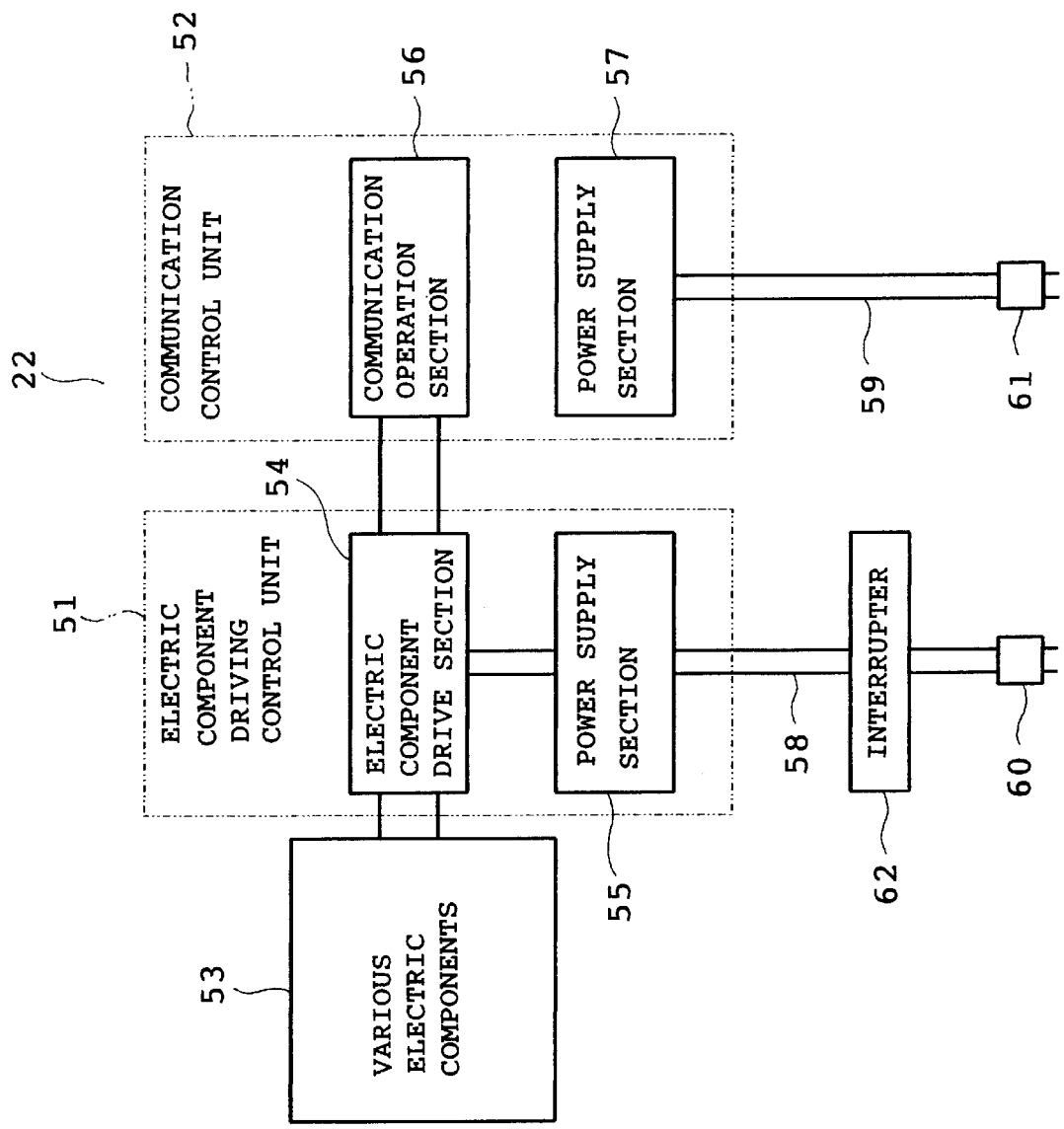
FIG. 17 is a schematic block diagram showing an electrical arrangement of a laundry appliance control section in a second embodiment.

FIG. 17 illustrates a second embodiment of the invention. The laundry appliance control section 22 includes an electric component drive unit 51 and a communication control unit 52. The electric component drive unit 51 includes an electric component drive section 54 and a power supply 55. The electric component drive section 54 has a function of controlling the motor 21, first and second valves 24 and 25, drain valve 26, water supply pump 27 and heater 28 on the basis of detection signals from various sensors. The communication control unit 52 includes a communication operation section 56 and a power supply section 57. The communication operation section 56 has a function of communicating with the home server 8, a function of controlling the display circuit 29, the operation circuit 30 and a power supply interrupter 62 which will be described later. The communication operation section 56 is connected to the electric component drive section 54. The power supply sections 55 and 57 are connected via electric supply lines 58 and 59 to power supply plugs 60 and 61 respectively. The aforesaid power supply interrupter 62 is connected to the electric supply line 58 connecting the power supply section 53 of the electric component drive unit 51 to the plug 60.

In the case where the result of analysis is transmitted from the Web server 4 via the home server 8 to the laundry appliance 1 when the abnormal condition is due to leak, for example, the communication operation section 56 drives the interrupter 62 so that power supply to the electric component drive unit 51 is interrupted. Consequently, the laundry appliance 1 can be prevented from being maintained in the abnormal state for a long period of time.

Figure 18:
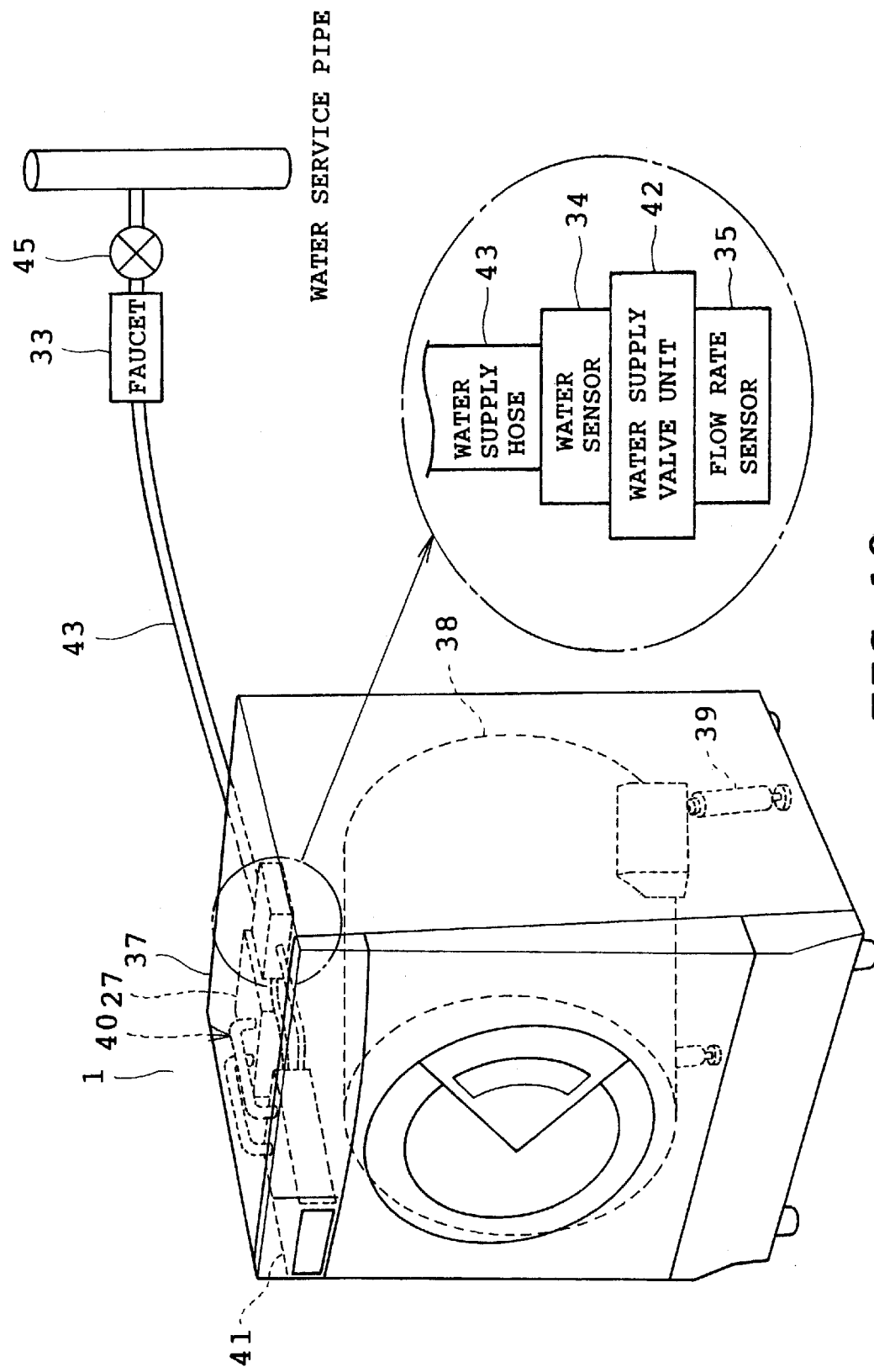
FIG. 18 is a view similar to FIG. 3, showing a third embodiment.

FIG. 18 illustrates a third embodiment of the invention. An electromagnetic valve 45 is provided between a water service pipe and a faucet 33. The electromagnetic valve 45 is controlled by the control section 22 of the laundry appliance 1. When the test program, "E5-T1" corresponding to the abnormal condition in the water supply system is transmitted to the laundry appliance 1, the control section 22 drives the electromagnetic valve 45 and then carries out detection by means of the water sensor 34. Based on a result of detection by the water sensor 34, the Web server 4 determines whether the faucet 33 is left open.

When the Web server 4 determines that the abnormal condition is due to water leakage, the control section 22 immediately closes the electromagnetic valve 45. Consequently, damage due to the water leakage can be limited to minimum.

In each of the foregoing second and third embodiments, a portable terminal unit may be provided so as to access via the Internet 3 and home server 8 to the laundry appliance control section 22. The control section 22 may operate the power supply interrupter 62 or electromagnetic valve 45 in response to a command from the portable terminal unit. Consequently, the user can use the portable terminal unit to remote operate the power supply interrupter 62 or electromagnetic valve 45 outside the home.

The laundry appliance 1 may be provided with a function of connecting via the Internet 3 to the Web server 4. In this case, the laundry appliance 1 can be used independently without connection to the home network. Further, the laundry appliance 1 and the home server 8 may be integral.

A wireless network such as Bluetooth or a wire network such as Ethernet may be constructed regarding the communication between the server 8 and the laundry appliance 1.

The laundry appliance control section 22 may transmit information about an operating state thereof to the home server 8 constantly or at predetermined intervals. Based on the information about the operating state of the laundry appliance 1, the control section 5 of the Web server 4 may detect an abnormal condition of the laundry appliance.

The test program may previously be stored on the control section 22 and may be executed by the instructions from the Web server 4. Furthermore, the server control section 9 or control section 22 may have a function of analyzing the cause for the abnormal condition. Additionally, when the abnormal condition is due to a failure of the laundry appliance 1 and the visit and repair by the serviceman is required, the Web server 4 may ask the home server 8 whether contact should be made with the service center. Contact may be made with the service center depending upon the result of inquiry.

In the foregoing embodiments, the home server 8 and the laundry appliance 1 cause the respective displays 10 and 29*a* to display various messages according to the operating state of the laundry appliance 1. Audio messages or an alarming sound may be produced from a speaker or buzzer, instead.

The Web server 4 may transmit message data via the Internet 3 to the home server 8 and the laundry appliance 1. Based on the message data, the home server 8 and the laundry appliance 1 may cause the respective displays 10 and 29*a* to display the message.

The foregoing description and drawings are merely illustrative of the principles of the present invention and are not to be construed in a limiting sense. Various changes and modification will become apparent to those of ordinary skill in the art. All such changes and modifications are seen to fall within the scope of the invention as defined by the appended claims.

We claim:

1. A remote control system for a laundry appliance, comprising:

a remote control device externally accessible via a communication network, the remote control device including a data base storing coping information used to cope with an abnormal condition occurring during operation of the laundry appliance, for every type of the laundry appliance, the coping information corresponding to causes for the abnormal condition and including analytic information about an operating state of the laundry appliance upon occurrence of the abnormal condition, the number of times of the abnormal condition and a measure coping with the abnormal condition;

a laundry appliance control device connected via the communication network to the remote control device so as to transmit information about an abnormal condition via the communication network to the remote control device when the abnormal condition has occurred in the laundry appliance; and analyzing means for analyzing the coping information corresponding to the abnormal condition in the laundry appliance to infer a cause for the abnormal condition of the laundry appliance, wherein when the analyzing means analyzes a plurality of pieces of the analytic information, a higher priority is given to the analytic information corresponding to a cause for the abnormal condition with a larger number of times of occurrence.

2. A system according to claim 1, wherein the remote control device transmits a test program via the communication network to the laundry appliance control device when receiving information about the an abnormal condition transmitted from the laundry appliance, wherein the laundry appliance control device causes the laundry appliance to execute an inspection of the abnormal condition according to the received test program and transmits results of execution of the test program via the communication network to the remote control device, and wherein the analyzing means analyzes a result of execution of the test program to infer a cause for the abnormal condition.

3. A system according to claim 2, wherein the remote control device has a plurality of the test programs according to a plurality of contents of the abnormal condition of the laundry appliance respectively.

4. A system according to claim 1, wherein the laundry appliance includes a water pouring vessel having a detergent chamber and a softener chamber, a water supply valve unit having a first valve opened when water is supplied through the detergent chamber and a second valve opened when water is supplied through the softener chamber, and valve control means for controlling the water supply valve unit, and when the analysis by the analyzing means shows that the abnormal condition is due to an abnormal operation of one of the first and second valves of the water supply valve unit, the remote control device transmits via the communication network to the laundry appliance control device an emergency operation program which causes the valve control means to open the other of the first and second valves during water supply, and the laundry appliance control device causes the laundry appliance to execute the emergency operation for the abnormal condition according to the received emergency operation program.

5. A system according to claim 1, wherein the laundry appliance includes a water pouring vessel having a detergent chamber and a softener chamber, a water supply valve unit having a first valve opened when water is supplied through the detergent chamber and a second valve opened when water is supplied through the softener chamber, and valve control means for controlling the water supply valve unit, and when the analysis by the analyzing means shows that the abnormal condition is due to an abnormal operation of the first valve of the water supply valve unit, the remote control device transmits via the communication network to the laundry appliance control device an emergency operation program which causes the valve control means to open the second valve during water supply, and the laundry appliance control device causes the laundry appliance to execute the emergency operation for the abnormal condition according to the received emergency operation program.

6. A system according to claim 1, wherein the laundry appliance includes a water tub, a water level sensor for sensing a water level in the water tub, and water supply and drain control means for controlling water supplying and draining operations on the basis of a result of detection by the water level sensor, and when the analysis by the analyzing means shows that the abnormal condition is due to an abnormal operation of the water level sensor, the remote control device transmits via the communication network to the laundry appliance control device an emergency operation program which causes the water supply and drain control means to execute water supplying and draining operations based on set water supply and drain times, and the laundry appliance control device causes the laundry appliance to execute the emergency operation for the abnormal condition according to the received emergency operation program.

7. A system according to claim 6, which further comprises storage means for storing data of a water supply flow rate and a drain flow rate for the water tub, and wherein the water supply time is set on the basis of the water supply flow rate the data of which is stored by the storage means and the drain time is set on the basis of the drain flow rate the data of which is stored by the storage means.

8. A system according to claim 1, wherein the laundry appliance includes a heater for heating wash water and heater control means for controlling energization of the heater, and when the analysis by the analyzing means shows that the abnormal condition is due to an abnormal operation of the heater, the remote control device transmits via the communication network to the laundry appliance control device an emergency operation program which causes the heater control means to prohibit energization to the heater, and the laundry appliance control device causes the laundry appliance to execute the emergency operation for the abnormal condition according to the received emergency operation program.

9. A system according to claim 1, wherein the laundry appliance includes a water tub, a rotatable tub rotatably mounted in the water tub, a motor for rotating the rotatable tub, elastic support means for elastically supporting the water tub, and motor control means for performing a variable seed control of the motor, and when the analysis by the analyzing means shows that the abnormal condition is due to an abnormal operation of the elastic support means, the remote control device transmits via the communication network to the laundry appliance control device an emergency operation program which causes the motor control means to drive the motor so that a rotational speed of the motor during a dehydrating operation is rendered lower than usual, and the laundry appliance control device causes the laundry appliance to execute the emergency operation for the abnormal condition according to the received emergency operation program.

10. A system according to claim 1, wherein the laundry appliance includes a lid closing and opening an access opening and lid sensing means for sensing an open or closed state of the lid, and when the analysis by the analyzing means shows that the abnormal condition is due to an abnormal operation of the lid sensor, the remote control device transmits via the communication network to the laundry appliance control device an emergency operation program which disallows the laundry appliance to execute a dehydrating operation, and the laundry appliance control device causes the laundry appliance to execute the emergency operation for the abnormal condition according to the received emergency operation program.

* * * * *